United States Patent Office 3,186,218
Patented June 1, 1965

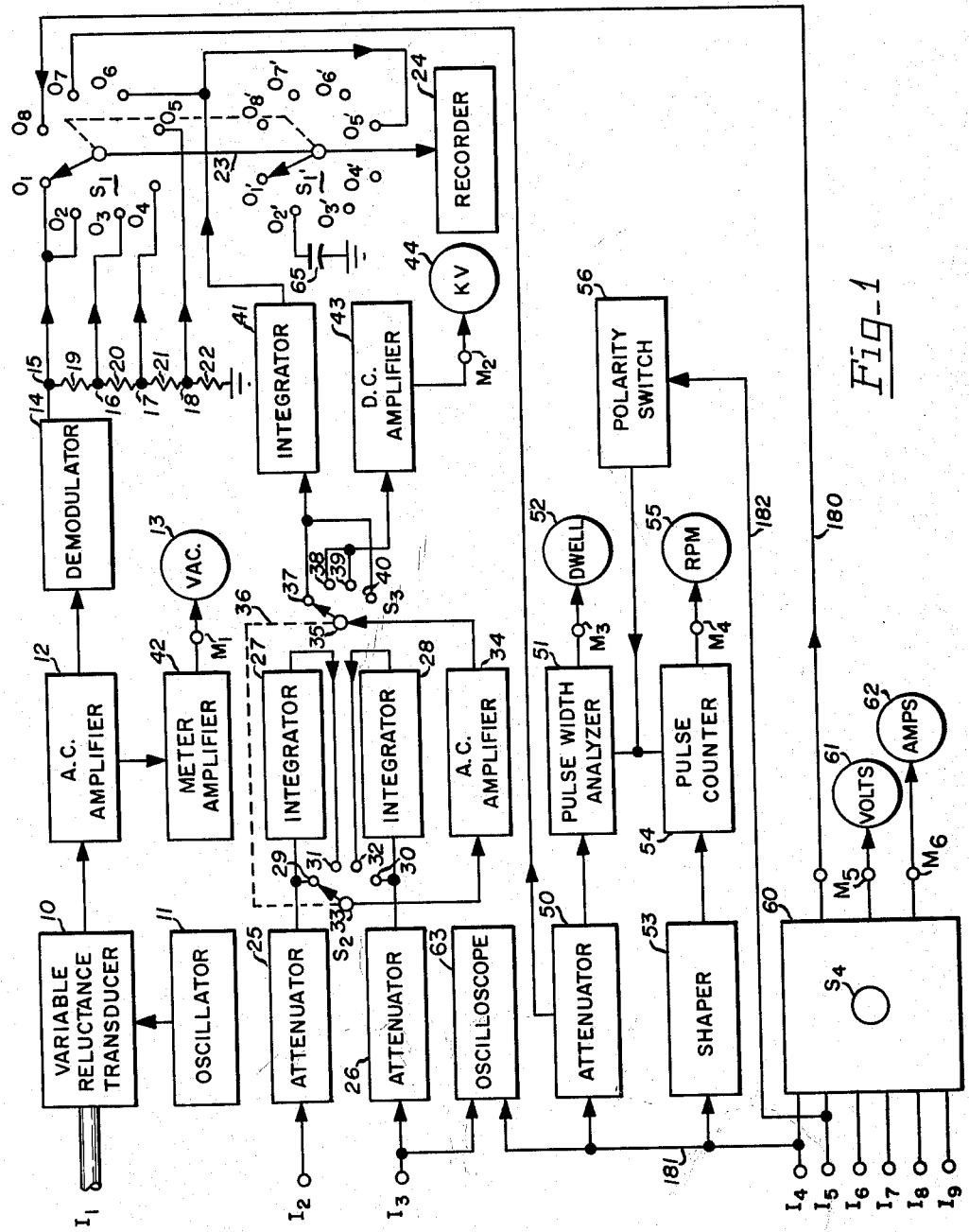

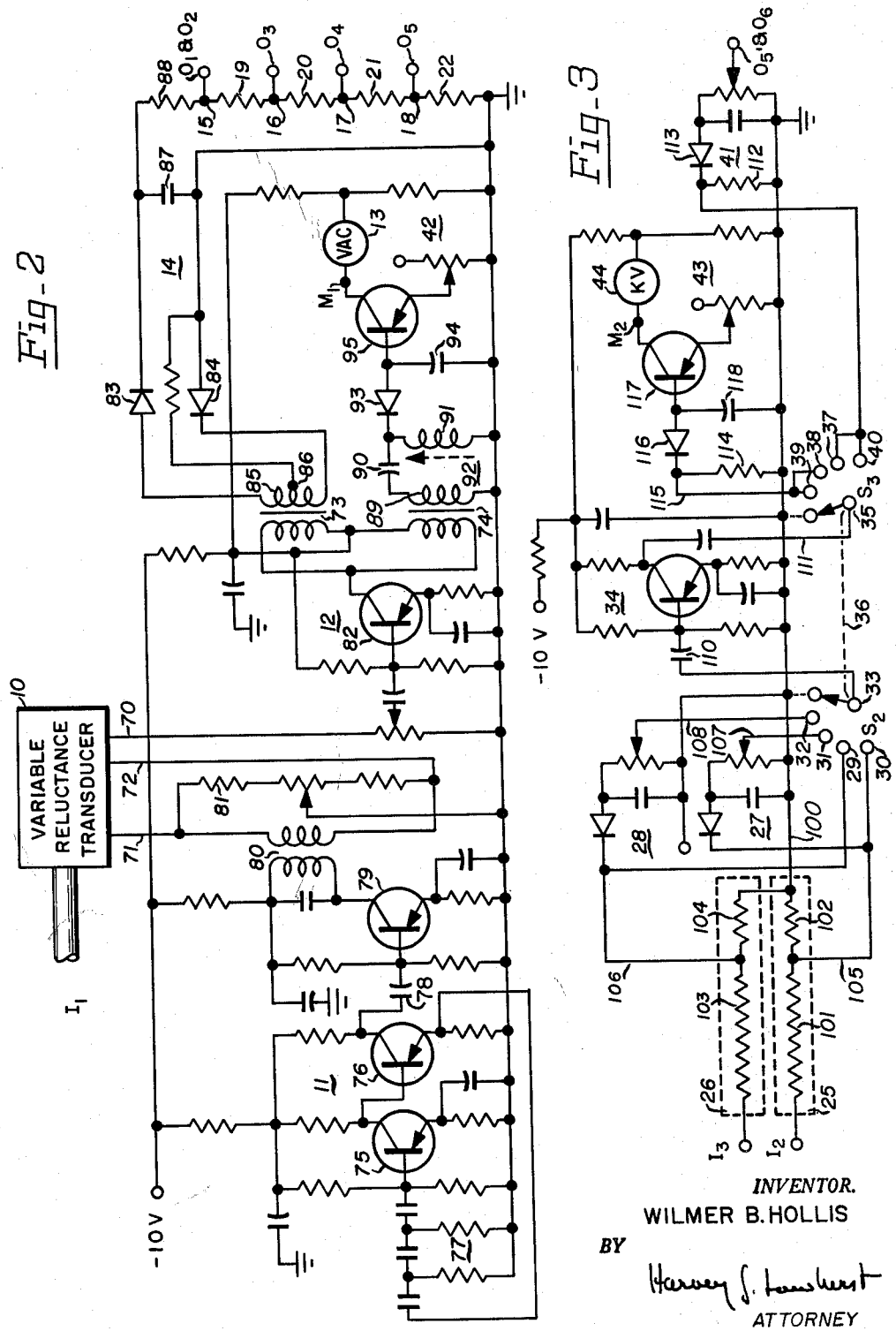

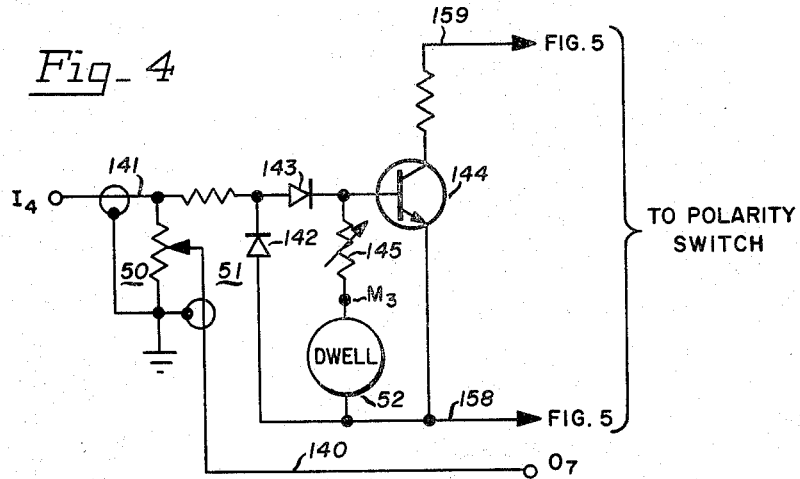
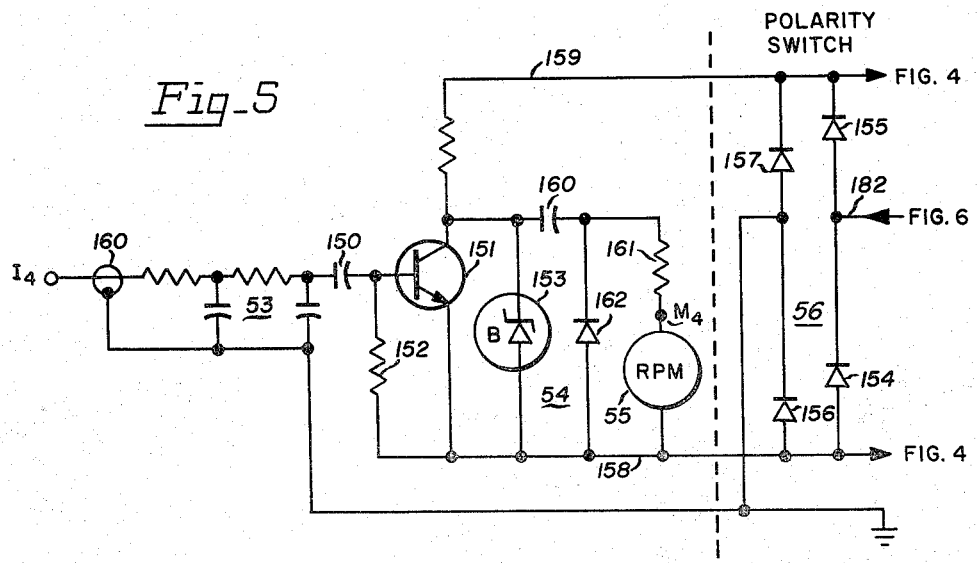

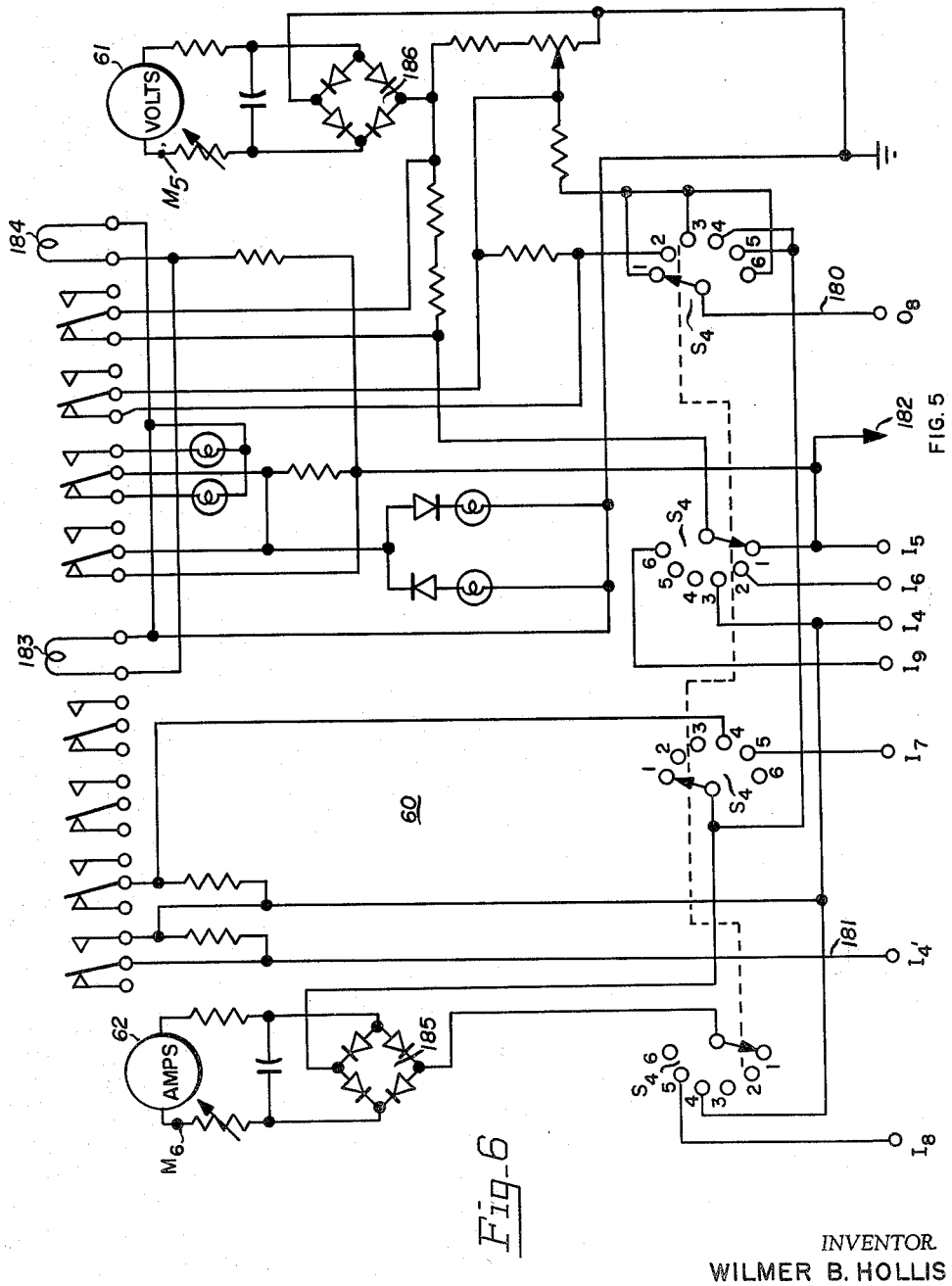

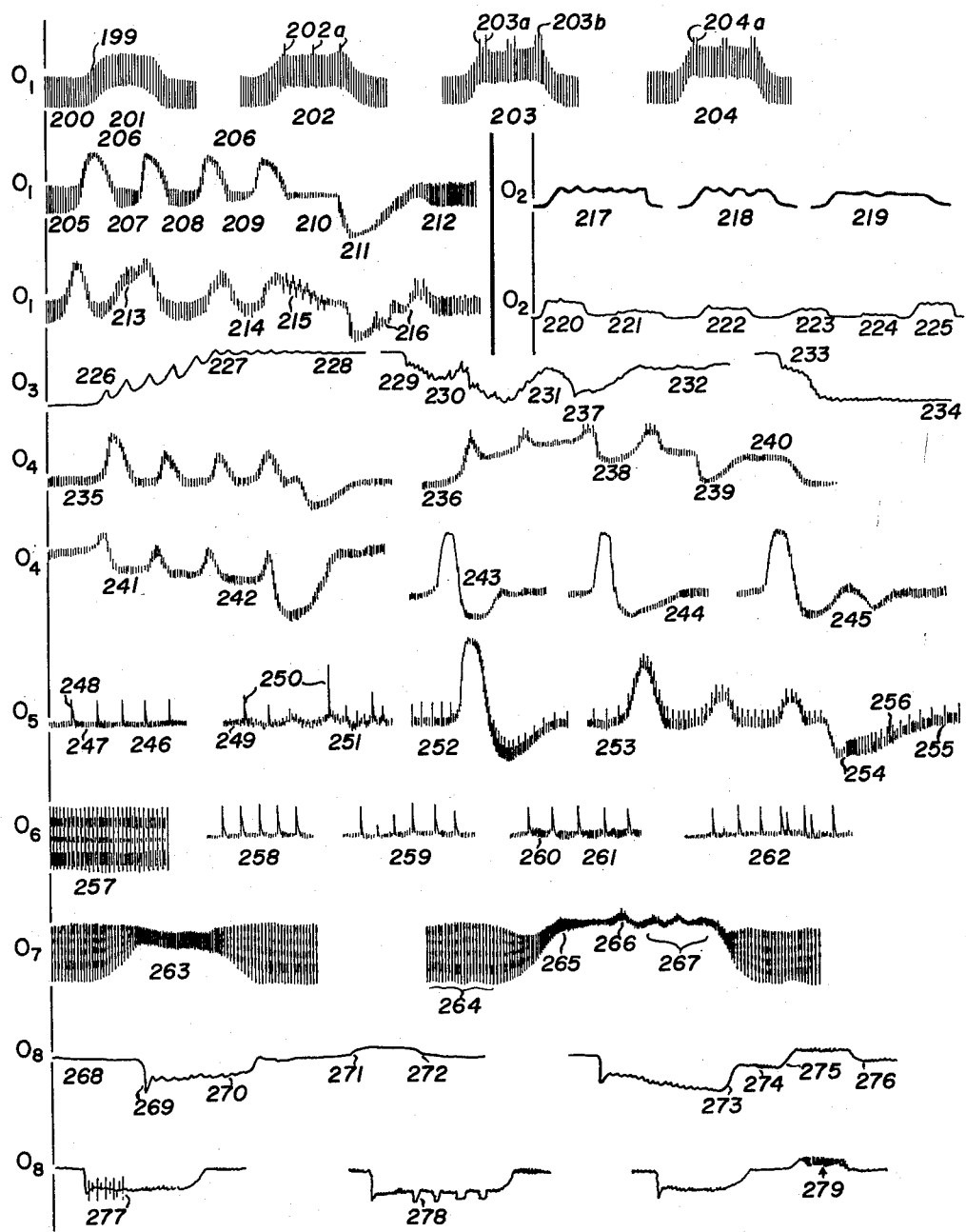
Fig_7

1

3,186,218
PERFORMANCE TESTING DEVICE AND METHOD
FOR INTERNAL COMBUSTION ENGINES
Wilmer B. Hollis, Carmichael, Calif., assignor to Startron
Corporation, Mountain View, Calif., a corporation of
California
Filed Apr. 9, 1962, Ser. No. 186,331
13 Claims. (Cl. 73—116)

This invention relates to a performance testing device and method for testing the performance of internal combustion engines and more particularly to a device and method for producing a written record of a plurality of different static and dynamic functions and conditions of an internal combustion engine and particularly of the variations of the internal pressures.

Generally speaking, the static and dynamic performance testing of internal combustion engines as a means of locating malfunctions and preventive maintenance is still in its infancy. The owner of an internal combustion engine, such as for example an automobile, who brings his vehicle to a garage for repairs, periodic inspections, check-ups, or tunings, must content himself with a crude performance check and depend, so to say, on the ear of the mechanic.

Often, after work has been performed on an automobile, the final test is to have the foreman take the car out for a test drive and if the car feels all right it is regarded as in proper condition. Setting of the timing mechanism, adjusting the output of the voltage regulator, checking the vacuum and many other functions and for conditions are usually adjusted independently based either on the manufacturer's new engine specifications, or for maximum power output without any attention being paid to the condition of the engine or the interrelationship between the various functions and conditions of the engine parts. If the maximum obtainable power output is found to be much below a rated minimum value, the engine is regarded as malfunctioning and is usually torn apart in order to determine the cause of such poor output power.

With regard to preventative maintenance, very little has been done in the past to ascertain periodically whether or not certain components of the engine were giving below marginal performance and required attention. As long as the output power was found to be above a given minimum value this was considered completely satisfactory and was regarded as discharging any responsibility of the garage or maintenance place to the owner. The same is, of course, true for other engines such as airplane engines, outboard motors, industrial engines and many others.

Even though a very large amount of time and money is spent each year by manufacturers on improving internal combustion engines, and by automobile and other engine owners on maintaining their engines in good condition by periodic check-ups and repairs, development of an efficient and accurate device and method for properly and cheaply testing the performance of engines on the users level has been severely neglected.

Some of the testing devices that have been developed utilized metered output power as their main criteria for performance testing. Other testing devices now in use utilize the magnitude and timing of the electrical signals developed in the ignition system, which are set to manufacturer's specifications regardless of the condition of the engine. Still other testing devices utilize a combination

2 of such criteria for determining engine performance. A testing device recently proposed contemplates utilizing the mechanical vibration developed by the engine for performance analysis.

None of the prior or proposed testing devices appear to be capable of accurately and completely testing an engine and of tuning the engine to a maximum power output after taking into consideration the age and condition of the engine. Furthermore, none of the prior art testing devices utilize the variations and changes in the internal pressure of the engine under a variety of conditions to ascertain performance.

It is therefore a primary object of this invention to provide a comprehensive performance testing device and method which may be hooked up to an internal combustion engine in a minimum of time to dynamically and statically test specific functions and conditions capable of meaningful interpretation of the general performance of the engine.

It is also an object of this invention to provide a device and a method for testing the performance of engines utilizing the internal pressure variations of the engine, either solely or in combination with certain electrical signals from the ignition system.

It is another object of this invention to provide a device to which a number of inputs from an internal combustion engine may be applied and which operates upon such inputs and provides a number of outputs indicative of the overall performance of the engine.

It is a further object of this invention to provide a performance testing device having data output signals indicative of what preventive maintenance should be undertaken to keep the engine at peak performance.

It is still another object of this invention to provide a performance testing device having data output signals indicative of any malfunctioning of mechanical, electrical or hydraulic parts and further indicative of what particular part malfunctions.

It is a still further object of this invention to provide a performance testing device for an internal combustion engine which indicates, at an early state, possible sources of future trouble areas and thereby making possible the correction of a poor condition before the complete destruction of the part or the complete breakdown of the engine.

It is still a further object of this invention to provide a device for tuning an engine which is in poor or wornout condition to achieve peak output power without resorting to the manufacturer's specifications, which do not reflect such an engine condition.

Other objects and a better understanding of the invention may be had by reference to the following description, taken in conjunction with the accompanying drawings, in which:

FIG. 1 is a schematic block diagram of the performance testing device of this invention;

FIG. 2 is a schematic circuit diagram of the pressure transducer portion of the device of FIG. 1;

FIG. 3 is a schematic circuit diagram of the secondary ignition system portion of the device of FIG. 1;

FIG. 4 is a schematic circuit diagram of the primary ignition system portion of the device of FIG. 1;

FIG. 5 is a schematic circuit diagram of the tachometer circuit portion of the device of FIG. 1;

FIG. 6 is a schematic circuit diagram of the voltage and current metering portion of the device of FIG. 1; and FIG. 7 depicts graphs useful in explaining the operation of the performance testing device of this invention and shows a number of specified input and output signals.

Referring now to the drawings and particularly to FIG. 1 thereof, there is shown the schematic block diagram of the device of this invention having a number of input terminals $I_1$ through $I_9$ on the left hand side of the figure and a number of output terminals $O_1$ through $O_8$ on the upper right hand side of the figure. The input quantities applied to the various input terminals I and the output quantities derived from the various output terminals O are designated by the same reference characters as their respective terminals, for greater simplicity. Accordingly, the output quantity derived from output terminal $O_3$ is also referred to as output quantity $O_3$.

Input quantities $I_1$ through $I_9$ are being applied to the input terminals from an internal combustion engine and include such quantities as internally developed pressures, spark plug signals, coil secondary signal, breaker point signal, battery signal, coil primary signal, regulator signal, generator signal, and others, as will be explained in detail in the ensuing description. Output quantities $O_1$ through $O_8$ are obtained from the output terminals of the device of this invention and are applied to the terminals of a selector switch $S_1$ whose pole selector terminal is connected to a recorder.

In addition to output quantities $O_1$ through $O_7$ applied to switch $S_1$, there are a number of additional output quantities derivable from the device of this invention which are, in a preferred embodiment of this invention, applied to meters for visual observations. These additional output quantities and their corresponding output terminals have been designated by reference characters $M_1$ through $M_6$.

For the purpose of description, the device of FIG. 1 may be regarded as being made up of a pressure (high and low) transducer portion, a secondary ignition system portion, a primary ignition system portion, a tachometer circuit portion, and a voltage and current meter circuit portion.

Referring now to the high and low pressure transducer portion, input quantity $I_1$ is air or some other gaseous fluid under high or low pressure such as manifold pressure. Input quantity $I_1$ is applied to terminal $I_1$ which forms the input hose of a variable reluctance transducer 10 which may be of standard design such as transducer P1431 commercially obtainable from Wianco Engineering Company located in Pasadena, California. Applied to another input terminal of transducer 10 is a carrier signal from a carrier oscillator 11 of a suitable frequency such as, for example, 5 kilocycles per second or any other frequency suitable for operation with transducer 10.

The output signal provided by transducer 10 is a modulated carrier signal having a frequency corresponding to that of oscillator 11 and a modulator envelope reflecting the changes of pressure of input quantity $I_1$ to some convenient scale. The modulated carrier signal is applied to an alternating current amplifier 12, tuned to the carrier frequency, for amplification of the modulated carrier signal.

Amplifier 12 is provided with a pair of output transformers, one of which is connected to demodulator 14 and the other output transformer is connected to a tuned meter amplifier 42. Meter amplifier 42 has an output terminal $M_1$ to which a direct current volt meter 13 is connected for measuring the output quantity $M_1$ which is the voltage signal corresponding to the modulation envelope of the carrier signal to provide a visual indication of the instantaneous pressure of input quantity $I_1$. Meter 13 may be calibrated to some suitable scale to read pressure directly in lbs. per square inch above or below atmospheric pressure as may be the case.

The output transformer of amplifier 12 that is connected to demodulator 14 applies the amplified modulated carrier signal to demodulator 14 for stripping the modulated carrier signal from the modulated envelope to provide an output quantity which is at all times proportional to the instantaneous pressure of the input quantity of $I_1$. This output quantity, which may be termed the pressure signal, is applied to terminal 15, which is connected to ground via resistive impedances 19, 20, 21 and 22. Additional output terminals 16, 17 and 18 are provided between the various resistive impedances so that the pressure signal is available at different magnitudes.

Terminals 15, 16, 17 and 18 are respectively connected to output terminals $O_1$, $O_3$, $O_4$ and $O_5$ which form selector terminals of multipole switch $S_1$.

As will become better understood in connection with the description of the operation of this invention, switch $S_1$ is actually a two-deck switch, the corresponding terminals of the second deck being designated by an added prime. Output terminal 15 is also connected to output terminal $O_2$ and output terminal $O_2'$ is connected to ground via a capacitive impedance 65 to form a low pass filter with resistive impedances 19, 20, 21 and 22 to restrict the pass band to below 30 cycles per second. In other words, when selector terminal 23 is connected to terminals $O_2$ and $O_2'$, the output signal is subjected to the low pass filter to restrict its frequency to below, say, 30 cycles per second.

The pole selector terminal 23 of switch $S_1$ is connected to a suitable output recorder 24. A recorder which has been found useful in connection with practicing this invention, is a Brush recorder capable of equal and opposite deflections for positive and negative voltages and capable of several tape speeds, say 30 to 60 inches per minute. The desired frequency response is about 300 cycles per second. A suitable pen movement for such a recorder is manufactured by Brush Instruments, Inc., Los Angeles, California, as Model 915.

Referring now to the secondary ignition portion of the device of this invention, input quantity $I_2$ is selected as the spark plug signal, that is, the electrical signal from any one of the spark plug posts from the internal compression engine under test. As will be described more fully hereinafter, input quantity $I_2$ is usually changed from one spark plug post to the next during a complete performance test of an engine. Input quantity $I_2$ is applied to an attenuator 25 to reduce its amplitude by a suitable scale factor, say 2,500 for more convenient handling.

Input quantity $I_3$ is selected as the coil secondary signal, that is, the electrical signal from the ignition coil secondary which is applied to the distributor. Input quantity $I_3$ is likewise applied to an attenuator 26 to reduce its amplitude by a suitable scale factor of, say, 1,400 for more convenient handling. The reduced amplitude signals from attenuators 25 and 26 are then respectively applied to integrating circuits 27 and 28 whose function is to integrate the positive pulses of the spark plug signal and the coil secondary signal.

The reduced amplitude signals from attenuators 25 and 26 are also applied respectively to terminals 29 and 30 of a four terminal switch $S_2$ and the integrated signals from integrators 27 and 28 are respectively applied to terminals 31 and 32 of switch $S_2$. The selector pole 33 of switch $S_2$ is connected to the input terminal of an alternating-current amplifier 34 whose output terminal 35 forms the selector pole 35 of a switch $S_3$. Switches $S_2$ and $S_3$ are ganged as shown by broken line 36.

Switch $S_3$ also has four terminals just like switch $S_2$ which are respectively designated by reference characters 37, 38, 39 and 40. Terminals 37 and 40 are tied together and connected to an integrator 41 and terminals 38 and 39 are tied together and connected to a direct-current amplifier 43. Integrator 41 may be similar to integrators 27 and 28 and operates in much the same way by integrating the applied positive pulses. The negative input signal portion is clipped prior to integration of the resulting signal. In this manner, sharp positive spikes are obtained which are representative of the magnitude of the applied signal. Direct-current amplifier 43 has applied thereto the integrated signal from either integrator 27 or 28 and provides an output quantity $M_2$ (at output terminal $M_2$) which is proportional to the integrated signal. A kilovolt (kv.) meter is connected to output terminal $M_2$ to measure this undulating voltage and to provide a visual indication of the voltage output of the spark plug signal and the coil secondary signal. Integrator 41 is connected to output terminals $O_6$ and $O_5'$ of switch $S_1$ and $S_1'$, respectively.

As is readily seen, switches $S_2$ and $S_3$ provide means of selecting either input quantity $I_2$, the spark plug signal or input quantity $I_3$, the coil secondary signal for either recording or for metering. In case of recording, the selected input quantity is applied to output terminals $O_5'$ and $O_6$ via terminals 29, 37 or 30, 40 and in case of metering the selected input quantity is applied to output terminal $M_2$ via terminals 31, 38 or 32, 39.

For the primary ignition system portion of the device, the input quantity $I_4$ is selected as the breaker point signal, that is, the electrical signal from the distributor breaker point terminal. The breaker point signal is applied to an attenuator 50 to reduce its amplitude by a suitable scale factor of say 100 for more convenient handling. The attenuated breaker point signal is directly applied to output terminal $O_7$ of switch $S_1$ for recording.

Additionally the attenuated breaker signal (which may be differently attenuated) is applied to a pulse width analyzer 51 for determination of the percentage cam dwell of the primary ignition system. The output quantity $M_3$ from analyzer 51 is a direct-current signal whose amplitude is an indication of the time the points are closed to the time the points are open and this signal is applied to meter 52 via output terminal $M_3$. Meter 52 provides a visual indication of the percentage dwell of the primary ignition system.

For the tachometer circuit portion of the device, the input quantity selected is likewise the breaker point signal since it provides a convenient signal including information on the engine revolution in pulse form. The breaker point signal is first applied to a filter network 53 which removes the high frequency components from this signal. Network 53 may be a low pass filter whose cut-off frequency drops off very sharply above 600 cycles per second. The filtered breaker point signal is applied to a pulse counter 54 which counts the number of times the points separate and which provides an output voltage whose magnitude is proportional to the number of pulses counted per unit time. This output quantity is referred to as $M_4$ and is metered by an r.p.m. meter 55. In this portion of the device, no quantity is connected to recorder 24 since a meter reading of the engine revolution is sufficient for most performance testing operations.

Since both the operation of pulse width analyzer 51 and pulse counter 54 depend on the polarity of the applied pulses of the breaker point signal with respect to ground, and since the base level of the breaker point signal also depends on whether the positive or the negative battery post is grounded, a polarity switch 56 is utilized to automatically adjust for proper polarity levels. Polarity pulse switch 56 is connected to both pulse width analyzer 51 and pulse counter 54 and has applied to it the "high" battery signal voltage, whether it be negative or positive with respect to the grounded battery post.

The voltage-current metering circuit portion of this device has applied thereto a plurality of input quantities each one of which either singly or in combination has been found to provide important performance data for recording or metering or both. The metering circuit portion of this device comprises basically a switching circuit 60, shown in greater detail in FIG. 6, having a recorder output lead 180 connected directly to output terminal $O_8$ of switch $S_1$, a voltage metering output lead connected to an output terminal $M_5$ and a current metering output lead connected to output terminal $M_6$. A volt meter 61 is connected to output terminal $M_5$ and an ammeter 62 is connected to output terminal $M_6$.

Switching circuit 60 includes a six-position, multi-deck switch $S_4$ for performing a number of selections with regard to the six input quantities $I_4$, $I_5$, $I_6$, $I_7$, $I_8$ and $I_9$ applied thereto. The various input quanities are as follows, electrical signals: Quantity $I_4$ has been defined heretofore and is the breaker point signal. Quantity $I_5$ is the high terminal of the engine battery, henceforth referred to as the battery signal, and may be either positive or negative with respect to ground. Quantity $I_6$ is the battery terminal of the ignition coil primary of the engine, henceforth referred to as the coil primary signal. Quantity $I_7$ is the regulator input lead from the generator of the engine henceforth referred to as the regulator signal. Quantity $I_8$ is the generator lead of the engine henceforth referred to as the generator signal. A one ohm resistive impedance is inserted in series with the field circuit lead from the generator to the regulator. Generally at the regulator itself, $I_7$ is the regulator side while $I_8$ is the generator side, this signal is utilized for determining the current output capabilities of the generator, and quantity $I_9$ is unspecified and input terminal $I_9$ may be regarded as an auxiliary input terminal, should the need for recording or metering an additional quantity become necessary.

An oscilloscope 63 (see FIG. 1) may be provided as a valuable adjunct to the device of this invention to view the primary or the secondary ignition pulses. Accordingly, either the breaker point signal or the coil secondary signal are applied to the two input terminals of a standard oscilloscope.

Referring now to FIG. 2, oscillator 11 applies its carrier signal to variable reluctance pressure transducer 10 via leads 70 and 71 and transducer output lead 72 applies the modulated carrier signal to amplifier 12. From amplifer 12 the amplified signal is transformer coupled by means of transformer 73 to demodulator 14 and by means of transformer 74 to direct-current amplifier 42. Transformers 73 and 74 have their respective primary winding connected in parallel.

Oscillator 11 is a phase shift oscillator operable from a 10 volt power supply to develop a carrier signal of 5 kilocycles per second. Basically, oscillator 11 is a two stage direct coupled amplifier made up of transistors 75 and 76. The emitter of transistor 76 is coupled, through a capacitive-resistive phase shift network 77, to the base of transistor 75. Network 77 is tuned to provide a 180 degree phase shift at the desired output frequency.

The carrier signal is then capacitively coupled, via impedance 78, to the base of a single stage amplifier 79 for amplifying the carrier signal. The amplified carrier signal is then applied to leads 70 and 71 via tuned output transformer 80, leads 70 and 71 being connected to the transformer secondary winding. A resistive impedance 81 may be shunted across the transformer secondary having its adjustable center tap connected to ground. Adjustment of the center tap allows nulling of the signal from transducer 10.

The output signal from transducer 10 is applied to amplifier 12 through RC coupling lead 72 to the base of a transistor 82 which forms the sole stage of the amplifier. The amplified modulated carrier signal is then applied to transformers 73 and 74 which are coupled to the collector of transistor 82.

Demodulator 14 includes a pair of diodes 83 and 84 connected to the end terminals of the secondary transformer winding 85 and a resistive impedance connected between ground and the center tap 86 of winding 85. Both diodes 83 and 84 are poled in the same direction and the anode of diode 84 is grounded. A capacitive impedance 87 is connected between ground and the cathode of diode 83 to form a low pass filter to filter out the carrier frequency signal. The cathode of diode 83 also forms the output terminal of demodulator 14 and is connected to ground through impedances 88, 19, 20, 21 and 22.

Direct-current amplifier 42 employs secondary winding 89 together with capacitive impedance 90 and inductive impedance 91 to form a tuned circuit 92 tuned to one hundred cycles below the carrier frequency, that is, to 4900 cycles per second. The voltage developed by tuned circuit 92 is applied to detector diode 93 which has its anode connected to ground through a capacitive impedance 94 to remove the carrier frequency signal. The anode of diode 93 is also connected to the base of transistor 95 which forms the direct current amplifier 42.

Referring now to the schematic circuit diagram of FIG. 3 of the secondary ignition portion of the device of this invention, input terminals $I_2$ and $I_3$ are connected respectively to attenuators 25 and 26. Attenuators 25 and 26 may take the form of conventional voltage dividers connected to ground lead 100. Each voltage divider comprises a pair of serially connected resistance impedances such as 101 and 102 for attenuator 25 and 103 and 104 for attenuator 26. Because of the high voltage of the spark plug signal and the coil secondary signal, attenuators 25 and 26 may each be enclosed in an insulating jacket in a manner well known to those skilled in the art.

Output lead 105 from attenuator 25 is applied to terminal 30 of switch $S_2$ and to integrating network 27. Similarly, output terminal 106 for attenuator 26 is applied to terminal 29 of switch $S_2$ and to integrator 28. The output lead 107 from integrator 27 and output lead 108 from integrator 28 are respectively applied to terminals 31 and 32 of switch $S_2$.

Both integrators 27 and 28 may be similar in construction except that their time constants may differ since the pulse repetition rate of the coil secondary signal is greater than the pulse frequency signal of the spark plug signal. Integrator 27 includes a diode whose cathode is connected to lead 105 and whose anode is connected through a resistive and a capacitive impedance in parallel to ground. Integrator 28 is similarly constructed having its cathode connected to lead 106 but is provided with a smaller capacitive impedance for higher frequency response.

The time constant of each integrator is selected so that even for very fast engine operation, the capacitive impedance has sufficient time to fully discharge so that upon integrating the next pulse the capacitive impedance does not hold a residual charge. If the capacitive impedance retains a residual charge then the magnitude of the integrated signal will not truly reflect the energy content of the applied pulse but will have added thereto a voltage representing the residual charge.

The integrated signal from either integrator 27 or 28 is then applied, through switch $S_2$ to a coupling capacitive impedance 110 which forms the input portion of amplifier 34. Amplifier 34 is a single stage alternating current amplifier, having an output lead 111 capacitively coupled to the collector of a transistor. Output lead 111 is connected to pole selector terminal 35 of switch $S_3$.

Integrator 41 is constructed much like integrator 27 except that a resistive impedance 112 is connected between the cathode of diode 113 and ground lead 100. The purpose of impedance 112 is to provide an output bias for diode 113. Again, careful selection of the time constant of integrator 41 is necessary to assure a complete discharge of the capacitive impedance prior to the arrival of the next input pulse.

Direct current amplifier 43 has an input stage which includes a grounded input resistive impedance 114 to which input lead 115 is connected. A diode 116 connected between lead 115 and the base of a transistor 117 provides for rectification of the amplified input signal. A by-pass capacitive impedance 118 is connected between the anode of diode 116 and ground lead 100 to provide alternating current filtering. Output terminal $M_2$ is connected directly to the collector of transistor 117.

Referring now to FIG. 4 the cam dwell metering circuit includes a potentiometer input circuit forming attenuator 50. Pick-off lead 140 from potentiometer 50 is connected directly to output terminal $O_7$ as shown in FIG. 1. Since high frequency transient spike voltages are present in the breaker point signal, input cable 141 and output cable 140 may both be shielded as shown to prevent signal pick-up by other circuits.

The breaker point signal is also applied via input lead 141 to a pulse width analyser circuit 51 which comprises a pair of diodes 142 and 143 connected in series and the breaker point signal is connected to the junction of the cathode of diode 142 and the anode of diode 143. The cathode of diode 143 is connected directly to the base of a transistor 144 and the anode of diode 142 is connected directly to the emitter of transistor 144. Output terminal $M_3$ is coupled, via adjustable resistive impedance 145 to the base of transistor 144.

Diode 142 is biased in such a manner as to act as a clipper to the incoming voltage pulses and to provide pulses of constant amplitude for application to diode 143. Transistor 144 in its quiescent state draws full base current through dwell meter 52. Application of the constant amplitude pulses to diode 143 reduces the forward bias and thereby decreases the base current. As a result dwell meter 52 draws less current. Since the pulses are applied much more rapidly than meter 52 can follow, the width of each pulse in relation to the width between pulses is averaged by meter 52 so that meter 52 provides a reading which indicates the duration of the incoming pulses in relation to their frequency.

Tachometer circuit shown in FIG. 5 utilizes the breaker point signals which are directly applied to waveshaping network 53 comprising a two section resistance capacitance filter for removing unwanted high frequency components from the incoming signal. The filtered breaker point signal is applied, via a coupling capacitor 150, to pulse counting circuit 54.

Pulse counter 54 comprises a transistor 151 whose base is connected through resistive impedance 152 to the emitter for proper biasing. A zener diode 153 is connected between collector and emitter so that diode 153 is reversed biased. A voltage of about 6 volts is applied between the collector and emitter through polarity switch 56 which includes four diodes 154, 155, 156 and 157. Diodes 154 and 155 are connected in series between power supply leads 158 and 159. Likewise diodes 156 and 157 are series connected between power supply leads 158 and 159. Input voltage is applied between diodes 154 and 155 and the junction point between diodes 156 and 157 is grounded. Power supply leads 158 and 159 are likewise applied to the circuit of FIG. 4 to power transistor 144.

In operation, zener diode 153 holds the collector at 3.9 volts above the emitter. The collector circuit also includes a charging capacitor 160 in series with a resistive impedance 161 and r.p.m. meter 55. Paralleling resistive impedance 161 and meter 55 is a diode 162. When a positive pulse is applied to the base, transistor 151 exhibits an increased collector current which lowers the voltage across diode 153 and charges capacitor 160. Capacitor 160 is charged up in stair-step fashion until a level is established depending on the discharge rate and the frequency of the incoming pulses. The charging level is readable by meter 55 and is a measure of the pulse rate of the breaker point signal and thereby an indication of the engine speed.

FIG. 6 shows the internal arrangement of the voltage current metering or switching circuit 60 which comprises basically a four-deck six position switch to which the various input quantities $I_4$, $I_5$, $I_6$, $I_7$, $I_8$ and $I_9$ are applied. Circuit 60 also has an output lead 181 as shown in FIG. 1 to apply output quantity $I_4$ to the tachometer circuit and the primary ignition circuit. Also shown is output lead 180 which goes directly to output terminal $O_8$ of switch $S_1$. Output lead 182 goes to polarity switch 56.

Relays 183 and 184 are provided to convert circuit 60 from a 6 volt measuring meter board to a 12 volt measuring circuit board by adding resistive impedances where necessary. Ammeter 62 is provided with its own polarity switch 185 which operates in the same manner as described in connection with the polarity switch 56 of FIG. 5. Voltmeter 61 also has associated therewith a polarity switch 186 which is independent of the polarity of the high terminal post voltage of the engine battery.

The remainder of circuit 60 provides the necessary wiring so that each input quantity in turn can be applied to meter 61 or 62 or both and to recorder lead 180 depending on the position of switch $S_4$. More specifically, when switch $S_4$ is in position 1, the battery signal $I_5$ is applied to output terminal $O_8$ for recording and to meter 61 for measuring the voltage. When switch $S_4$ is in position 2, the coil primary signal $I_6$ is recorded and metered just as before. When switch $S_4$ is in position 3, the breaker point signal $I_4$ is recorded and metered. When switch $S_4$ is in position 4, the current in the coil primary circuit is metered by meter 62 and recorded. In this mode of operation the actual quantity determined is the difference in voltage between input quantities $I_6$ and $I_4$ as has been previously explained. When switch $S_4$ is in position 5 the generator field current is metered and recorded from input quantities $I_7$ and $I_8$. When switch $S_4$ is in position 6 an auxiliary input quantity $I_9$ may be applied to both meter 61 and recorder 24.

Reference is made now to FIG. 7 showing recorded graphs of the various output quantities $O_1$ to $O_8$ from recorder 24 for various conditions and functions. More particularly, all graphs obtained from the same output terminal are identified by the reference character of the output terminal. Additional reference characters are utilized to explain different graphs or portions thereof obtained from the same output terminal.

The input quantity $I_1$ for output quantities $O_1$, $O_2$, $O_4$ and $O_5$ is the vacuum obtained from the largest unrestricted vacuum pocket of the engine. Usually, this pocket is situated directly below the carburetor within the intake manifold system. Since the vacuum pressure of this pocket changes each time a valve opens, all output quantities $O_1$, $O_2$, $O_4$ and $O_5$ are basically sine waves whose frequency is equal to the repetition rate of closing of all intake valves and all exhaust valves. In FIG. 7, these sine waves, which are obtained from demodulator 14 after removal of the carrier frequency signal are indicated by vertical lines such as by composite line 199.

Graph portion 200 shows the manifold vacuum condition for normal idle and graph portion 201 shows the same with one spark plug shorted out to ground so that one cylinder does not fire. If one cylinder is disabled the vacuum level decreases. Graph portion 202 shows an idling engine housing a leaking intake valve in the disabled cylinder causing a decrease of vacuum pressure each time the leaking valve opens. This is very clearly shown by pips 202a.

Graph portion 203 shows the disabled cylinder when housing a leaking exhaust valve with a slightly leaking intake valve. The leaking exhaust valve is shown by pips 203a and the slightly leaking intake valve is shown by pips 203b. Graph portion 204 shows the disabled cylinder as having a leaking exhaust valve (pips 204a) while the intake valve is in good condition.

Accordingly, the condition of each exhaust and intake valve of each cylinder can be determined by idling the engine at a speed which is well within the frequency of the recorder and disabling cylinders in sequence. The best observations of the valve conditions have been observed at an engine speed of about 500 revolutions per minute.

Graph portion 205 shows again the vacuum fluctuations at normal idling speed just as graph portion 200. When the engine under test is accelerated, the vacuum level drops as shown by graph portion 206 and when the engine is decelerated, the vacuum level rises as shown by graph portion 211. More particularly, graph portions 205 and 212 show normal idling conditions, graph portions 206 show accelerations from idling speed first to 1000 revolutions per minute (graph portion 207) and then stepwise to 1500, 2000 and 2500 revolutions per minute (graph portions 208, 209 and 210 respectively). Thereafter the engine is decelerated to idling speed.

The graph portion below the one just described is obtained in the same manner but shows some abnormal conditions. For example, graph portion 213 shows a low r.p.m. stumble, also known as a "flat spot" in the carburetion system as would occur when a carburetor metering jet is plugged. Graph portion 214 shows another stumble point at about 2000 r.p.m., and graph portion 215 shows a very rough and bad stumble point at 2500 r.p.m. These stumble points may be due to a defective carburetor float valve or the high speed jets are ejecting a large amount of fuel without properly vaporizing the fuel into a properly balanced fuel mixture. Graph portion 216 indicates a poorly performing timing train which is sometimes due to timing gear or chain chatter.

Referring now to output quantity $O_2$, which is substantially the same as output quantity $O_1$ from which the valve modulation has been removed by capacitive impedance 65. In other words, output quantity $O_2$ is the remaining direct current level of output quantity $O_1$. Graph portions 218 to 225 are taken of a disabled cylinder and show compression capabilities and ring condition of the cylinder. Graph portion 217 shows a good or normal cylinder, graph portion 218 shows a piston having improperly seated rings and a high vacuum pressure point occurring intermittently and graph portion 219 shows very leaky rings which give practically no compression as evidenced by the absence of compression pulses.

Graph portions 220 to 225 show the compression comparison of the same cylinders of an engine under test. Graph portion 220 shows a cylinder having good compression, graph portion 221 shows a cylinder having low compression, graph portion 222 shows a cylinder in fair condition, graph portion 223 shows a poor cylinder which requires time to build up compression, graph portion 224 shows a cylinder having practically no compression and graph portion 225 shows a cylinder having excellent compression which builds up immediately and is held constant.

Output quantity $O_3$ is derived from an input quantity which is connected to certain pressure and vacuum points of the engine other than the manifold. For example, if input quantity $I_1$ is connected into the output part of a fuel pump, graph portion 226 shows the start of the pumping cycle, and between graph portions 226 and 227 a minimum of five and a maximum of 10 fluctuations should be observed having a ripple content as shown by graph portion 228. If input quantity $I_1$ is selected as the input pressure to the windshield wiper motor, the condition of such a motor may be ascertained by the device of this invention. Graph portion 229 shows normal start of the motor with leaks developing as the vacuum increases. These leaks are shown in graph portions 230 and 231. Graph portion 232 shows a wandering level of the motor vacuum which cannot maintain a static level for constant speed operation. Graph portion 233 to 234 represents a good tight system comprising a vacuum hose, associated tubing, a wiper motor, and a vacuum accessory booster pump.

Output quantity $O_4$, which is the same as output quantity $O_1$, but of lesser sensitivity, is utilized in determining the vacuum advance and the mechanical advance system of the distributor and the idle fuel mixture condition of the carburetor. Test conditions are the same as used in obtaining graph portions 205 to 212, that is, the engine is step-wise accelerated to a maximum speed and then returned to idle. In the case of the distributor condition, graph portion 235 shows a distributor in good timing condition with both vacuum and mechanical advance systems working normally.

Graph portions 236 to 237, on the other hand, show a distributor with a badly retarded condition, with the vacuum system not active, and not able to return to a normal level. The mechanical advance condition of the distributor is poor as shown by graph portions 238 to 239. Graph portion 240 shows the distributor not returning to its original idle level, indicating a sticking mechanical governor. Graph portion 241 shows an advanced condition with vacuum and mechanical advancing systems working since graph portion 242 indicates that alignment exists with graph portion 241.

Carburetor normal idle jet adjustment is shown by graph portion 243. Graph portion 244 shows a lean condition while graph portion 245 shows a very rich condition. Output quantity $O_5$, which is the same as output quantity $O_4$ but of lesser sensitivity, to which is added the spark plug signal in use as a general performance test. Combination of the attenuated pressure signal and the spark plug signal provides an indication of how each spark plug performs over the entire vacuum range. More particularly, output quantity $O_5$ shows the vacuum signal 247 and the spark plug signal 248 displayed in graph portion 246. Graph portion 246 indicates a normal or good engine condition since the level of vacuum signal 247 is constant and the magnitude of spark plug signal 248 is constant. Graph portion 251 shows poor engine performance since vacuum signal 249 is uneven and spark plug signal 250 is erratic and of varying amplitude.

Graph portion 252 shows the vacuum and spark plug signal under a surge condition for a properly performing engine. The spark plug signal in graph portion 252 for improper carburetion would show erratic spark plug signals due to a rich or "wet" cylinder conidtion or due to overloading the cylinders during deceleration.

Graph portion 253 shows output quantity $O_5$ under step accelerating conditions just like the one described in connection with the test for output quantity $O_1$. Both the vacuum and spark plug signal tend to enhance the timing train problems which would result in a graph portion 256.

Graph portion 254 to 255 shows the closely spaced pulses of high r.p.m. rates slowing down and separating to indicate a slower speed.

Output quantity $O_6$ shows the coil secondary signal as graph portion 257. As long as the wave form of graph portion 257 is smooth and uniform and has twice the amplitude of the spark plug signal, the coil is in good condition. With switches $S_2$ and $S_3$ suitably positioned, the spark plug signal as shown by graph portion 258 may be obtained. Graph portion 258 shows a normal spark plug signal.

Graph portion 259 shows an erratic misfiring spark plug as evident from the uneven pulse heights.

Graph portion 260 shows a noisy or high resistive secondary ignition wiring condition even though the constant pulse height of graph portion 261 indicates good plugs.

Graph portion 262 shows cross firing of the plugs due to secondary ignition wiring interaction. Output quantity $O_7$ is the breaker point signal and is shown in graph portion 263. Graph portion 263 shows a good or normal condition of the points in the distributor. Graph portion 264 shows a burned or bad breaker point condition. Graph portion 265 shows excessive backing plate movement. Graph portion 266 shows wobble and plate movement at the same instant while graph portion 267 shows excessive distributor shaft wobble.

Output quantity $O_8$ shows the battery signal at graph portion 268 under no load. Under starting load conditions graph portion 269 and 270 show a good battery condition which holds its charge and tends to return to its normal value even under a full engine cranking load.

Graph portion 271 shows the generator putting out a charge to revitalize the battery and graph portion 272 cutting indicates that the generator output is cut back when the engine returns to idle.

Graph portion 273 shows a battery in poor condition, i.e., one that is unable to retain a charge. Graph portion 274 shows the battery's inability to recover and to return to its original level. Graph portion 275 shows the generator charging the battery and graph portion 276 shows regulator action.

Graph portion 277 shows a noisy condition or a breaking down of the solenoid switch contacts, requiring immediate attention.

Graph portion 278 shows an engine with a cylinder that has exceptionally poor compression allowing the starter to essentially surge with the reduced load placed on it, and graph portion 279 shows a normal starter and battery performance but a generator having very poor and noisy brushes.

Many other performance characteristics and functions are discernable, in addition to the ones illustrated in FIG. 7, from the variations of the internal engine pressures. In fact, the internal pressures of the engine practically reflect the static and dynamic characteristics of every portion of the engine and its component parts in one way or another. As a practical matter, comprehensive test procedures may be set up for general use which may be compared to standard performance charts.

There has been described a means and a method for testing an internal combustion engine for proper performance using primarily the vacuum signal from the manifold and the spark plug signal from a selected spark plug post. The output signals derived by the device of this invention are meaningful and provide an indication of the condition of the engine under test and also of the condition of its component parts.

What is claimed is:

1. A performance testing device for an internal combustion engine to be tested comprising:
   (a) variable reluctance transducer means responsive to the instantaneous pressure in the manifold of the engine and operative to provide an electrical pressure signal corresponding to the instantaneous pressure in the manifold, said transducer means having a minimum frequency response equal of the highest anticipated repetition rate of the closing and opening of a valve multiplied by the total number of intake and exhaust valves in the engine.
   (b) means responsive to the electrical pulse applied to a selected spark plug of the engine and operative to provide a spark plug signal commensurate in magnitude with the total energy of the pulse and in position with the time of occurrence of the leading edge of the pulse;
   (c) means for algebraically adding said electrical pressure signal and said spark plug signal to provide a combined signal; and
   (d) recorder means responsive to said combined signal to provide a continuous visual record of the variations of said combined signal as a characteristic of the engine is changed, said recorder means having frequency response sufficient to provide a visual indication of the pressure changes caused by the opening and closing of the valves of the engine.

2. A performance testing device for an internal combustion engine to be tested comprising:
   (a) variable reluctance transducer means responsive to the instantaneous pressure in the manifold of the engine and operative to provide an electrical pressure signal corresponding to the instantaneous pressure in the manifold, said transducer means having a minimum frequency response in excess of the highest anticipated repetition rate of the closing and opening of a valve multiplied by the total number of intake and exhaust valves in the engine;

(b) means responsive to the electrical pulse applied to the distributor of the engine and operative to provide a coil secondary signal commensurate in amplitude with the total energy of the pulse and in position with the leading edge of the pulse;

(c) means for algebraically adding said electrical pressure signal and said coil secondary signal to provide a combined signal; and (d) recorder means responsive to said combined signal to provide a continuous visual record of the variations of said combined signal as a characteristic of the engine is changed, said recorder means having frequency response sufficient to record the pressure changes caused by the opening and closing of the valves of the engine.

3. The method of determining a selected performance characteristic of an internal combustion engine under test comprising the steps of:

(a) deriving an electrical pressure signal corresponding to the instantaneous pressure in the manifold of the engine which provides an indication of the pressure changes caused by the opening and closing of each intake and exhaust valve of the engine;

(b) varying a characteristic of the engine; and (c) continuously recording said electrical pressure signal upon a recorder whose frequency response is sufficiently large to depict the pressure changes caused by the valves of the engine during the period corresponding to the varying of the characteristic.

4. The method of determining a selected performance in accordance with claim 3 in which a selected spark plug in the engine is shorted out to provide an indication of a leaky valve in the cylinder associated with the selected spark plug.

5. The method of determining a selected performance characteristic in accordance with claim 3 in which the engine is stepwise accelerated from idle to maximum speed to provide an indication of flat spots in the combustion system of the engine.

6. The method of determining a selected performance characteristic in accordance with claim 3 in which the engine under test is smoothly decelerated from a higher to a lower speed to provide an indication of timing gear clatter in the engine.

7. The method of determining a selected performance characteristic in accordance with claim 3 in which said electrical pressure signal, prior to being applied to the recorder, is passed through a low-pass filter to remove valve modulation for providing an indication of the compression capabilities of each cylinder of the engine.

8. A method for determining the dynamic performance of the fuel pump system of an internal combustion engine comprising the steps of: deriving an electrical pressure signal commensurate with the instantaneous pressure at the output port of the fuel pump of the engine while accelerating the engine from idle to maximum speed; and recording the electrical pressure signal so derived upon a recorder to provide a continuous record of the fluctuation and ripple content of the pressure during the pumping cycle.

9. A method for determining the condition of the vacuum system of the windshield wiper motor of an automobile under test comprising the steps: deriving an electrical pressure signal commensurate with the instantaneous pressure at the input port of the windshield wiper motor; varying the speed of the internal combustion engine of the automobile; and continuously recording the electrical pressure signal upon a recorder to provide a record of the pressure variations for an indication of the condition of the windshield wiper motor vacuum system and the tightness of the vacuum connection between the engine and the wiper motor.

10. A method for determining selected dynamic operating characteristics of the distributor system in an internal combustion engine under test comprising the steps:

(a) deriving an electrical pressure signal commensurate with the manifold pressure of the engine;

(b) step wise accelerating and thereafter continuously decelerating the engine from idle to some predetermined speed and back to idle; and (c) continuously recording said electrical pressure signal to provide a record indicative of the vacuum and mechanical advance of the distributor system and the rotational characteristics of the mechanical governor.

11. The method of determining selected dynamic operating characteristics of an internal combustion engine under test comprising the steps of:

(a) deriving an electrical pressure signal commensurate with the instantaneous pressure of the manifold in the engine;

(b) deriving an electrical spark plug signal commensurate with the pulse applied to a selected spark plug of the engine;

(c) combining said electrical pressure signal and said spark plug signal to derive a combined signal;

(d) changing the engine speed between idle and a selected maximum speed; and (e) recording said combined signal upon a recorder having a frequency response sufficient to record the variations in pressure occurring during the opening and closing of the various intake and outlet valves to derive an indication of the performance of the timing chains and the ignition system.

12. The method of determining selected performance characteristics of an internal combustion engine under test comprising the steps of:

(a) deriving an electrical pressure signal commensurate with the instantaneous pressure of the manifold in the engine;

(b) deriving an electrical coil secondary signal commensurate with the electrical pulse applied to the distributor of the engine;

(c) combining said electrical pressure signal and said spark plug signal to derive a combined signal;

(d) changing the engine speed between idle and a selected maximum speed; and (e) recording said combined signal upon a recorder having a frequency response sufficiently wide to record the variations in pressure occurring upon the opening and closing of the various intake and exhaust valves during the time period of engine speed change to derive an indication of the performance of the ignition system.

13. The method of determining various performance characteristics of an internal combustion engine under test under various conditions of load comprising the steps of:

(a) deriving an electrical pressure signal commensurate with the instantaneous pressure in the manifold of that engine reflecting the changes in pressure due to the opening and closing of the intake and exhaust valve;

(b) deriving a spark plug signal commensurate with the pulse applied to a selected spark plug;

(c) deriving a coil secondary signal commensurate with the electrical signal from the ignition coil secondary;

(d) deriving a first combined signal commensurate with the algebraic sum of said electrical pressure signal and said spark plug signal;

(e) deriving a second combined signal commensurate with the algebraic sum of said electrical pressure signal and said coil secondary signal;

(g) deriving a breaking point signal commensurate with the electrical signal from the distributor breaker point terminal;

(h) changing the speed of the engine being tested between an idling speed and a maximum speed in a selected manner; and (i) recording each of the derived signals upon a recorder having a frequency response to record the pressure variations due to the opening and closing of said intake and exhaust valve to provide a record indicative of the various performance characteristics of the engine under test.

References Cited by the Examiner

UNITED STATES PATENTS

| | | | |
|---|---|---|---|
| 2,113,376 | 4/38 | Janco | 73—115 |
| 2,178,471 | 10/39 | De Bruin | 73—115 X |
| 2,448,322 | 8/48 | Piety | 73—35 |
| 2,496,337 | 2/50 | Boisblanc | 73—35 |
| 2,683,989 | 7/54 | Clark | 73—398 |
| 2,720,782 | 10/55 | Stein | 73—118 |
| 3,048,034 | 8/62 | Schultz | 73—116 |

RICHARD C. QUEISSER, *Primary Examiner.*